US007646290B2

United States Patent
Wey et al.

(10) Patent No.: US 7,646,290 B2
(45) Date of Patent: Jan. 12, 2010

(54) DECELERATION WARNING DEVICE AND METHOD FOR A MOTOR VEHICLE

(75) Inventors: Torsten Wey, Moers (DE); Mike Mould, Leverkusen (DE); Amin Kashi, Duesseldorf (DE); Jens Dornhege, Pulheim (DE)

(73) Assignee: Ford Global Technologies, LLC, Dearborn, MI (US)

( * ) Notice: Subject to any disclaimer, the term of this patent is extended or adjusted under 35 U.S.C. 154(b) by 380 days.

(21) Appl. No.: 11/673,172

(22) Filed: Feb. 9, 2007

(65) Prior Publication Data

US 2007/0194904 A1    Aug. 23, 2007

(30) Foreign Application Priority Data

Feb. 14, 2006  (EP) ................... 06101647

(51) Int. Cl.
*B60Q 1/00* (2006.01)
*B60Q 1/50* (2006.01)
*B60Q 1/54* (2006.01)
*B60Q 1/44* (2006.01)
*G06F 7/70* (2006.01)
*B60B 39/00* (2006.01)
*B60T 7/12* (2006.01)

(52) U.S. Cl. .................. 340/467; 340/441; 340/464; 340/466; 340/479; 701/70; 701/71; 701/78; 701/79

(58) Field of Classification Search .......... 340/441, 340/464, 466, 467, 479; 701/70, 71, 78, 701/79
See application file for complete search history.

(56) References Cited

U.S. PATENT DOCUMENTS

| 5,343,396 | A  | * | 8/1994  | Youngblood ........... 701/70 |
| 6,888,452 | B1 | * | 5/2005  | Gerhaher ............. 340/479 |
| 2002/0133282 | A1 | * | 9/2002  | Ryan et al. ............ 701/70 |
| 2002/0171542 | A1 | * | 11/2002 | Bloomfield et al. ..... 340/464 |
| 2005/0261819 | A1 | * | 11/2005 | Mepham et al. ......... 701/70 |

(Continued)

FOREIGN PATENT DOCUMENTS

DE    3702718 A1    8/1988

(Continued)

OTHER PUBLICATIONS

International Search Report for EP1818233, 1 Page, Sep. 27, 2006.

*Primary Examiner*—Daniel Wu
*Assistant Examiner*—Mark Rushing
(74) *Attorney, Agent, or Firm*—Frank A. MacKenzie; Brooks Kushman P.C.

(57) ABSTRACT

A deceleration warning device for reducing rear-end collisions in road traffic includes a sensor for detecting a longitudinal acceleration value, a control device receiving the longitudinal acceleration value, determining an acceleration limit value, and generating a warning signal if the longitudinal acceleration value exceeds the acceleration limit value, and a rear lighting display for displaying an alarm state when the control device emits a warning signal. Determination of the acceleration limit value is based upon a plurality of signals including an anti-lock braking system (ABS) signal and a brake pedal position signal. The control device is operable in one of three levels depending upon a detected quality of the signals.

11 Claims, 2 Drawing Sheets

U.S. PATENT DOCUMENTS

2006/0074540 A1 * 4/2006 Braunberger et al. .......... 701/70

FOREIGN PATENT DOCUMENTS

| DE | 4139215 | A1 | 6/1993 |
| DE | 29709110 | U1 | 7/1997 |
| DE | 19814574 | A1 | 10/1999 |
| DE | 10005867 | A1 | 8/2001 |
| DE | 10024881 | A1 | 1/2002 |
| DE | 10218652 | A1 | 11/2003 |
| EP | 0611679 | A2 | 8/1994 |

* cited by examiner

DECELERATION WARNING DEVICE AND METHOD FOR A MOTOR VEHICLE

BACKGROUND

1. Technical Field

The invention relates to a motor vehicle having a deceleration warning device for high negative accelerations. The invention also relates to a method for activating a warning signal on a motor vehicle.

2. Background Art

A considerable number of road traffic accidents fall into the category of rear-end collisions. In the context of the worldwide initiative for accident reduction such driving situations, or at least their results, could be significantly reduced if the occurrence of a deceleration or a braking process were displayed in an appropriate manner to the following vehicle.

Although it is usual to utilize brake lights, which indicate actuation of the vehicle brakes to following traffic, in braking systems of motor vehicles, these brake lights give only binary information on a braking process and do not indicate its intensity. This means that while the driver of a following vehicle sees that a braking process is being initiated in the vehicle ahead, he does not know how heavy the braking is.

A braking system which could indicate abrupt braking as supplementary information to the following traffic, and could therefore indicate a safety-critical situation at an early stage, would enable the driver of the following vehicle to react adequately to the danger situation more quickly.

Such warning systems have by now been implemented by various manufacturers in their vehicles, but do not yet offer an optimum compromise between system availability and potentially incorrect warnings. In some cases these systems not only come into operation in emergency braking actions, but signal that a vehicle is approaching the limit region. This can result in corresponding dissatisfaction among vehicle drivers and customers if assistance systems intervene too often or too early. In addition, there is a risk of incorrect reactions by other road users as a result of premature warning of deceleration.

The document DE 297 09 110 U1 relates to a warning device for motor vehicles having ABS braking systems which includes a warning transmitter which is activated by intervention of the ABS system in the braking process. Thus, a deceleration warning is known from DE 297 09 110 U1 which has detection of an ABS control action as a necessary precondition. This has significant disadvantages for its operation. For example, in the event of low friction values (e.g. on snow or ice), among other situations, incorrect warnings may occur because an ABS system is activated by braking actions which, in terms of deceleration, in no way represent emergency braking. Furthermore, in traffic conditions with high friction values of the underlying surface (e.g. dry road) there is no possibility of issuing a deceleration warning even for critical vehicle decelerations unless the ABS is activated. Thus, entirely normal ABS settings permit significant deceleration values without intervention by the ABS.

A further deceleration device is disclosed by DE 100 05 867 A1. The warning system known from this document emits warning signals when hazards are recognized. The warning system is equipped with electronic circuits and sensors which detect the vehicle's movement and the traffic situation to the rear, permitting conclusions to be drawn regarding the level of potential risk. The device described in this document presupposes simultaneous monitoring of the movement of the vehicle itself and of traffic to the rear, which monitoring must be effected by an appropriate sensor system. A hazardous situation is deduced from the difference between the vehicle's own movement and that of traffic to the rear, and corresponding warning signals are emitted. Any brake control system (ABS, ESP) present in the vehicle is taken into account only to the extent that activation thereof is included in the assessment of the risk potential. Deceleration warnings in the event of high negative accelerations without the intervention of ABS/ESP are not made possible, so that incorrect warnings in the event of low friction values are possible.

Finally, EP 0 611 679 B1 discloses a deceleration warning device in which a "total risk value" formed by means of time and/or distance integrals is generated for the warning. The intensity of the deceleration warning is then scaled with reference to the total risk value. Braking processes as a result of engine braking (closing the throttle) without actuation of the brake pedal, are also utilized in activating the deceleration warning. However, the high demands of the implementation proposed in that document, which are reflected in corresponding demands on the memory and computation capacity of a control unit, are to be regarded as disadvantageous.

SUMMARY

It is therefore the object of the present invention so to improve with simple means a motor vehicle having a deceleration warning device of the type mentioned in the introduction, and a corresponding method, that the disadvantages of conventional warning systems and brake light systems are avoided and the risk of rear-end collisions in road traffic is reduced.

This object is achieved according to the invention by a deceleration warning device comprising: means for detecting a longitudinal acceleration value a;

a control device designed to receive the longitudinal acceleration value a at one of its inputs and to calculate an acceleration limit value the exceeding of which prompts a warning signal to be emitted, the acceleration limit value being calculated while taking account of input parameters P, wherein a stage of the control device includes a "No function" level, a "Limited function" level and a "Normal function" level, a transition to or from a "Deceleration warning device active" state to or from a "Deceleration warning device inactive" state being executed in the "Limited function" level and in the "Normal function" level, in dependence on momentary input parameters P.

a filter device being interposed between the means for detecting a longitudinal acceleration value and the control device, and display means for displaying an alarm state when the control device emits a warning signal.

The device according to the invention makes it possible to inform following traffic as early as possible of the possible occurrence of an emergency braking event in order correspondingly to improve the reaction times of following drivers. The device utilizes a binary switching function which distinguishes only the system states "Emergency braking" and "No emergency braking": if the calculated acceleration limit value exceeds a preset value, the display means is activated. The parameters P which can be optionally input by the user or driver, or the input parameters, assist recognition of an emergency braking situation. These parameters may be, for example, the current weather situation or the degree of "sporting" driving style adopted by the driver. It is, of course, appropriate if the user or driver actually does not input the parameters influencing the operation of the device. It is conceivable that the user or driver himself adjusts the activation or deactivation. Self-evidently, however, it is also possible that parameters influencing the operation of the device can be input by the driver, although this must be regarded as optional.

In the context of the present description the expression "longitudinal acceleration value a" always refers, unless otherwise stated, to a braking or slowing-down event, and therefore to a negative acceleration value. In the following text longitudinal acceleration is sometimes also referred to as deceleration.

According to a preferred embodiment of the invention, the control device is additionally designed to terminate the emission of the warning signal after a time T, T being determined as a function of the further behavior of the driver, change in the acceleration values, vehicle speed and/or elapsed time since the switching on of the deceleration warning system. The simplest case of the alternatives described here consists in setting a constant time value for T. This embodiment has the advantage of keeping the algorithm for operating the inventive device simple, but it does not allow the current situation to be taken into account. On the other hand, if, alternatively or additionally, the change in acceleration value and vehicle speed are included in the calculation of T, the display means are prevented from possibly being switched off too soon, when a hazard situation continues to exist.

The control device preferably also has inputs for receiving signals of a brake control system and is designed to calculate the acceleration limit value while taking account of the signals of the brake control system. The brake control systems mentioned may be, for example, an anti-lock braking system (ABS) or an electronic stability program (ESP). By combining this information with the longitudinal acceleration value and the input parameters P, the availability of the deceleration warning system in further driving situations with less high deceleration values is improved, for example, in the case of a low road-surface friction value.

In utilizing the signals of a brake control system, the control device may be designed to measure the duration t of activation of the brake control system and to take account of the signal of the brake control system only if the duration t exceeds a preset limit value or a limit value resulting from the instantaneous vehicle state and/or environmental values. Evaluating the duration t ensures that, despite the increased availability of the deceleration warning, the possibility of incorrect warnings can be minimized. The time constant for evaluating intervention of the brake control system is either set as a fixed value or is determined from an input-output map dependent on deceleration a and vehicle speed V at the start of braking.

If an emergency brake assist system is present, its response is preferably coupled to the deceleration warning. For this purpose the control device may be designed to receive a signal regarding the activation state of a brake assist system of the vehicle and to take account thereof in calculating the acceleration limit value.

The control device may additionally be designed to ignore the signals of the brake control system if the brake control system acts on only one of the two driven wheels. The reason for this embodiment is that, in the case of braking processes with widely differing coefficients of friction on the two sides of the vehicle ("split-μ"), an ABS intervention is often activated without the presence of an emergency braking action. If this state-ABS control acting on only one of the two front-wheels is detected by evaluation of wheel speeds and ABS control information, no activation of the deceleration warning system takes place according to this preferred embodiment. If, however, a split-μ emergency braking action is present, the ABS intervention will act on both sides to reduce yaw excitation and the warning system is correspondingly activated.

According to a further preferred embodiment, the means for detecting a longitudinal acceleration value a include wheel speed sensors. The wheel speed sensors are physically connected to the control unit (CPU) of the controlled ABS/ESP braking system. For this reason signal quantization is generally resolved more precisely here than using the values available on a vehicle bus, and this ECU or CPU is therefore the preferred location for calculating deceleration. If necessary, longitudinal acceleration may alternatively be determined from wheel speed signals available on the vehicle bus. According to a further alternative embodiment, the longitudinal acceleration value a may be determined using the type and intensity of brake pedal actuation as a further input parameter.

Filtering of the signal flow downstream of the sensors and after determination of the deceleration may be advantageous in order to prevent incorrect triggering of the deceleration warning device by short-term peak values. For this reason, in a preferred embodiment of the invention, a filter device is interposed between the means for detecting a longitudinal acceleration value and the control device, in order to filter out short-term peak values of the acceleration value. The filtering is suitably selected to resolve the compromise between signal delay and signal quality.

Furthermore, the control device may be designed to adapt the acceleration limit value using a statistical mean value of the longitudinal and lateral acceleration values of a defined past time period (input parameters). This makes it possible to avoid incorrect triggering of the deceleration warning system during ambitious, in particular sporting driving. In other words, the device according to the invention may be adapted to specific driving habits of the user, thereby additionally refining the operation of the warning system.

The means for displaying an alarm state may be, for example, the flashing hazard warning lights separate from the conventional brake lights. This embodiment is especially advantageous because additional delay times occurring during enlargement of the brake lights or changing of brake light intensity can thereby be avoided. Of course, the alarm state may also be displayed by changing the intensity of illumination of the conventional brake lights, or brake lights having a variable illumination field may be used, if these measures are preferred for other reasons. In the last-mentioned case, the presence of an alarm or emergency braking state is indicated in that the size of the illuminated field is increased as compared to conventional braking. It is also possible to activate the brake lights themselves in such a way that they flash if an alarm signal is present, whereas they remain constant as usual during normal braking, for as long as the brake pedal is depressed. In any case, the way in which the warning is displayed to a following road user is independent of the triggering algorithm and can be executed according to existing guidelines of different countries.

According to the present invention there is also specified a method which is preferably executed when using the device according to the invention. The method for activating a warning signal to reduce rear-end collisions in road traffic comprises the following steps:

a) detecting a longitudinal acceleration value a;
b) calculating an acceleration limit value upon exceeding of which a warning signal is emitted, the calculation of the acceleration limit value including input parameters P and instantaneous vehicle state and/or environmental values;
c) interpositing a filter device between the means for detecting a longitudinal acceleration value and the control device, in which case a stage of the control device includes a "No function" level, a "Limited function" level and a "Normal function" level, a transition to or from a "Deceleration warning device active" state to or from a "Deceleration warning device inactive" state being executed in the "Limited function" level and in the "Normal function" level as a function of momentary input parameters P, and d) activating display means for displaying an alarm state if a warning signal is present.

The operation of the device according to the invention and of the method according to the invention is distinguished by high availability combined with avoidance of incorrect warnings. This is achieved by an interpreted utilization of optionally filtered longitudinal acceleration values, there being no exclusive dependence on the activation of braking control signals (ABS or ESP). At the same time, the availability of environment sensing systems is not a prerequisite for the use of the device according to the invention. With regard to the parameterization of acceleration and speed ranges, its operation can also be adapted simply to the requirements of different countries.

BRIEF DESCRIPTION OF THE DRAWINGS

Further advantageous embodiments of the invention are disclosed in the dependent claims and in the following description of the figures, in which:

DETAILED DESCRIPTION

Figure 1:
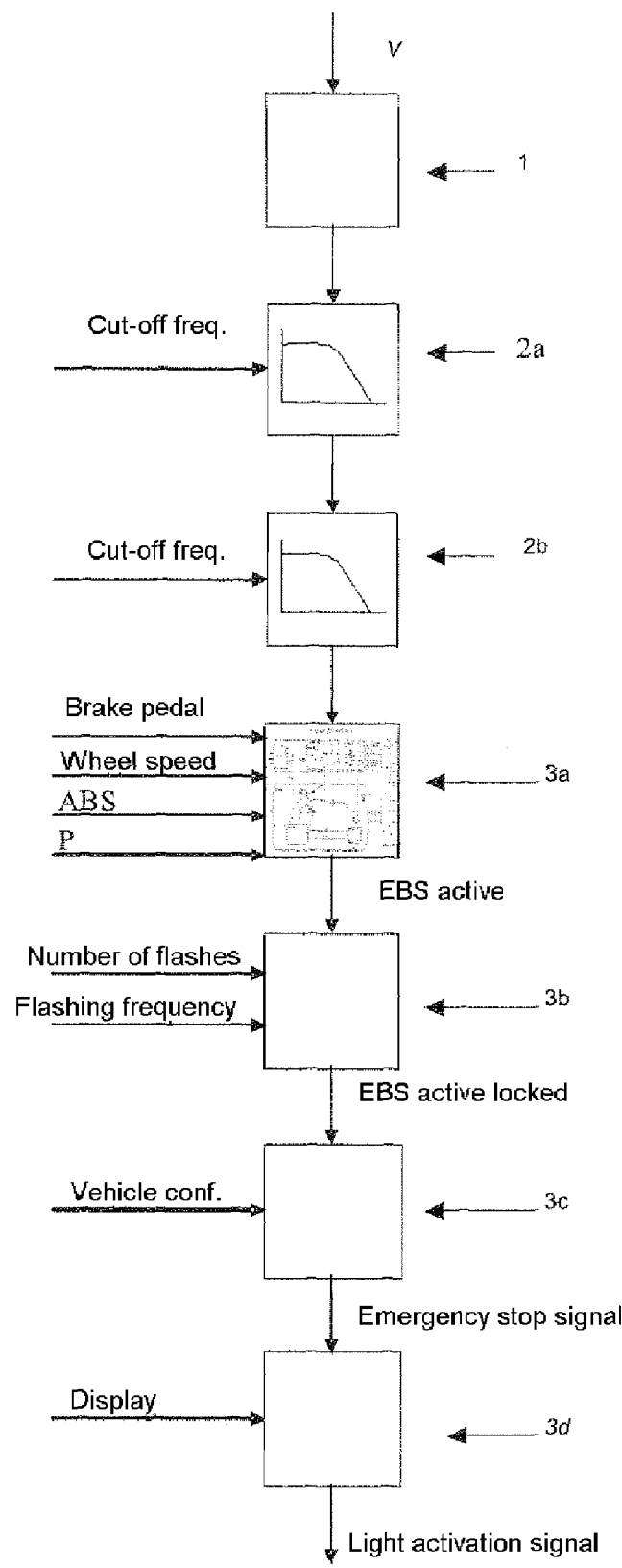
FIG. 1 is a schematic representation of the components and signal flows of an embodiment of the device according to the invention.

In FIG. 1 a means for determining a longitudinal acceleration value a is denoted by reference 1. This may comprise, for example, wheel speed sensors to the output of which is connected a computation device which calculates the actual acceleration value from the change of wheel speeds or vehicle speed V. Following the calculation, the unfiltered acceleration value is present at the output of the means 1. This value may be fed to one or more (here two) filter devices 2a, 2b. These filter devices may be, for example, first-order low-pass filters having an adjustable cut-off frequency. By using these filters short-term peak values of braking acceleration can be filtered out in order to avoid a response of the deceleration warning device which is not justified by the actual situation. The reliability of the device is thereby increased.

The filtered acceleration value a is now supplied to a control device which may include various control stages; the individual control stages may be implemented in separate hardware components. The control device includes, firstly, a logic means or an algorithm means 3a for activating and deactivating emission of the alarm. The acceleration limit value is calculated in said logic means or algorithm 3a using the parameters P optionally input by the user, or the input parameters P. If the longitudinal acceleration signal a exceeds this limit value, an alarm signal is emitted at the output of the logic device 3a. Further signals, such as wheel speed, degree of actuation of the brake pedal and an output signal from a brake control system, may be fed into this part of the control device. With the aid of this additional information the duration t, for example, on expiry of which the emitting of the warning signal is stopped, may be calculated. In the representation shown, an activation signal is present at the output of the logic device 3a. The algorithm means 3a is explained in more detail below.

In the next stage 3b of the control device, the warning signal is locked in order to ensure a minimal activation time for emission of the alarm. As parameters for the locking, the number of flashes of the flasher devices at a given flashing frequency may, for example, be set. These parameters are preferably preset permanently and stored in a suitable memory. Alternatively, an input means may also be implemented in order to be able to change the parameters optionally in a user-defined manner. This may be the same input means which is also optionally used by the user to input the parameters P discussed above for calculating the acceleration limit value.

The locked warning signal is now used in a following stage 3c of the control device to select the type of emergency stop signal as a function of the given vehicle configuration. That is to say, the control system indicates whether the brake lights or, for example, additionally present flashing indicators are to be activated by means of the emergency stop signal, and emits a corresponding emergency stop signal at its output.

Finally, a further stage 3d is present in the embodiment shown, in which the priority of the emergency stop signal or of another function of the activated display means is decided. A light activation signal is finally emitted at the output of this device in order to activate the display means.

The deceleration system according to the invention therefore consists, unlike the devices of the prior art, in integrating existing components of the vehicle, for example, an ABS or ESP module, the display means activation system, signals from wheel speed sensors and pedals, information on vehicle configuration and components of the HMI (Human-Machine Interface) (see FIG. 1).

The evaluation of the longitudinal acceleration signals using the vehicle parameters listed in FIG. 1 allows account to be suitably taken of environmental influences, in particular low road-surface friction values, which must not give rise to incorrect warnings. The decision as to how long the emergency braking warning lasts is determined by a combination of driving situation and time control.

Figure 2:
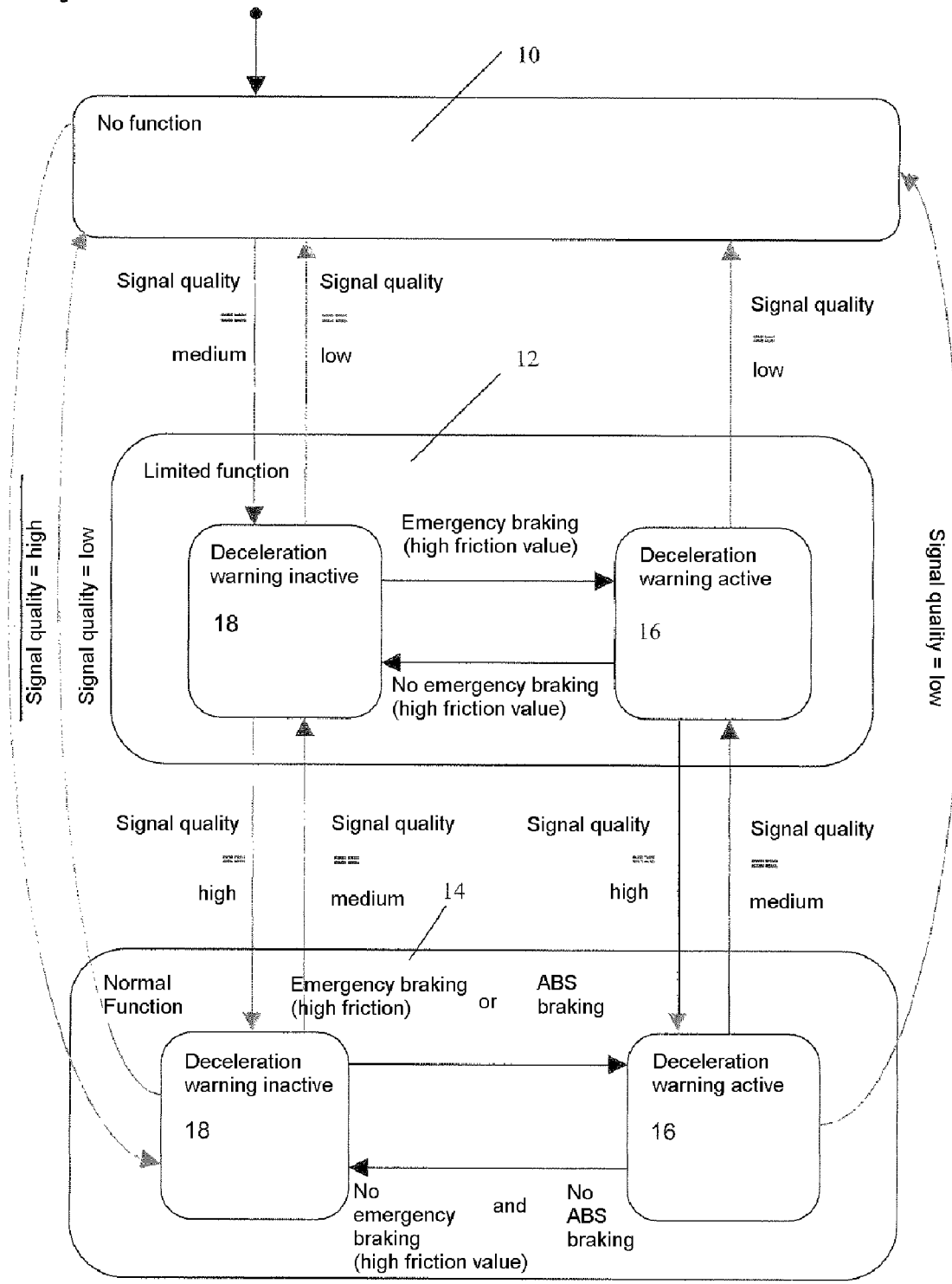
FIG. 2 is a block diagram of an exemplary embodiment of an algorithm for implementing the method according to the invention to activate a warning signal for the reduction of rear-end collisions in road traffic.

The algorithm means 3a represented in FIG. 2 processes signals present on a CAN or comparable bus in order to control the deceleration warning device according to the invention. The algorithm implements, in particular, three different function levels: "No function" (reference 10), "Limited function" (reference 12) and "Normal function" (reference 14), which are active as a function of the quality of the signals to be processed. The signal quality is determined by means of quality flags or other usual mechanisms for ensuring signal quality. Depending on the signal quality, the system switches between the individual function levels (references 10, 12 and 14) as represented by the correspondingly marked state transition arrows.

The system passes from function level 10 "No function" to function level 14 "Normal function" if signal quality is high. With medium signal quality the system passes from function level 10 "No function" to function level 12 "Limited function". If signal quality deteriorates in one of the function levels 12 "Limited function" and 14 "Normal function", the system switches back to function level 10 "No function". Likewise, the system switches from function level 14 "Normal function" to function level 12 "Limited function" if signal quality deteriorates from high to medium. Inversely, the system switches from function level 12 "Limited function" to function level 14 "Normal function" if signal quality improves from medium to high.

Within level 10 "No function" the deceleration warning device is inactive, as signal quality is too low to allow reliable activation of the deceleration warning device. Within the levels 12 "Limited function" and 14 "Normal function", which are active at medium and high signal quality respectively, a transition is executed to or from the "Deceleration warning active" state (reference 16) to or from the "Deceleration warning inactive" state (reference 18) as a function of a plurality of parameters or input parameters, as is described in detail below.

A function level 12 "Limited function" the system switches from the "Deceleration warning inactive" state (reference 18) to the "Deceleration warning active" state 16 if emergency braking takes place at high friction value [HighMuEmergencyBraking]. To achieve this, the variables brake pedal position [Brake], vehicle speed [VehicleSpeed] and longitudinal acceleration [LongAccOverGround], and the parameters speed threshold at high friction value [VehicleSpeedHighMuEntry] and deceleration threshold for longitudinal acceleration at high friction value [DecelerationHighMuEntry] are taken into account according to the transition function:

HighMuEmergencyBraking=(Brake
&& VehicleSpeed>VehicleSpeedHighMuEntry
&& LongAccOverGroundLongEvent==true
&& LongAccOverGround<DecelerationHighMuEntry);

In this case it can also be checked whether the longitudinal acceleration [LongAccOverGround] is lower for a minimum duration than the deceleration threshold for longitudinal acceleration at high friction value [LongAccOverGroundLongEvent].

A functional level 14 "Normal function" the system switches from the "Deceleration warning inactive" state 18 to the "Deceleration warning active" state 16 if emergency braking takes place at high friction value [HighMuEmergencyBraking] or if ABS braking [ABSEmergencyBraking] takes place. In addition to the variables and parameters listed above, the parameters speed threshold at low friction value [VehicleSpeedLowMu] and deceleration threshold for longitudinal acceleration at low friction value [DecelerationLowMuEntry] are taken into account. Likewise, it can be checked whether the ABS functionality is active for a minimum duration [ABSModelLongEvent]. This transition function can be described as follows:

ABSEmergencyBraking=(Brake
&& ABSModeLongEvent==true
&& LongAccOverGround<DecelerationLowMuEntry
&& VehicleSpeed>VehicleSpeedLowMu)

At both function levels 12 and 14 the system switches from the "Deceleration warning active" state 16 to the "Deceleration warning inactive" state 18 if emergency braking at high friction value [NotHighMuEmergencyBraking] no longer takes place. This transition corresponds to the inverted function of the transition emergency braking at high friction value [HighMuEmergencyBraking]. It can be checked individually whether the vehicle speed falls below a deactivation threshold [VehicleSpeedDeactivation] or whether the brake pedal position [Brake] is inactive. A further transition criterion is that longitudinal acceleration [LongAccOverGround] exceeds a deceleration threshold for longitudinal acceleration at high friction value [DecelarationHighMuExit] while at the same time the vehicle speed [VehicleSpeed] is above a minimum speed [VehicleSpeedAnyMuExit]. This can be described using the following transition function:

NotHighMuEmergencyBraking=
  VehicleSpeed<VehicleSpeedDeactivation
  || !Brake
  ||((LongAccOverGround>DecelerationHighMuExit)&&
    (VehicleSpeed>VehicleSpeedAnyMuExit));

In addition, at function level 14 it is checked during the transition from the "Deceleration warning active" state 16 to the "Deceleration warning inactive" state 18 whether no ABS braking [NotABSEmergencyBraking] is present, which can be described using the following relationship:

NotABSEmergencyBraking=!ABSModeLongEvent;

For the transition to the "Deceleration warning inactive" state at function levels 12 "Limited function" [DegradedOperationActive] and 14 "Normal function" [NormalOperationActive], an alternative can be defined if, in addition, a vehicle standstill state [Standstill] is taken into account, which can be described using the following relationship:

```
int Standstill = false;
if ( DegradedOperationActive || NormalOperationActive )
{
    if ( VehicleSpeed < VehicleSpeedAtStandstill ) Standstill = true;
}
else Standstill = false;
NotHighMuEmergencyBraking =
        VehicleSpeed < VehicleSpeedDeactivation
    || ( !Brake && !Standstill )
        || ( ( LongAccOverGround > DecelerationHighMuExit ) &&
( VehicleSpeed > VehicleSpeedAnyMuExit ) )
        || ( ( LongAccOverGround > AccelerationExit ) &&
    Standstill )
        || ( (VehicleSpeed > VehicleSpeedAfterStandstill ) &&
    Standstill );
NotABSEmergencyBraking = !ABSModeLongEvent;
```

In this case it can also be checked whether the vehicle falls below a minimum speed [VehicleSpeedAtStandstill], threshold values for longitudinal acceleration [AccelerationExit] and vehicle speed [VehicleSpeedAfterStandstill] being suitably adapted in the event of the vehicle being at standstill.

The particular transition functions are specified in C-like notation.

The above algorithm has been explained with reference to a state diagram in which transitions between function levels 10, 12 and 14 are controlled by the quality of the signals processed, which are tapped from a bus. Within the two function levels 12, 14, in which the deceleration warning according to the invention can be activated, state transitions are controlled by various parameters and variables, as listed above. The evaluation of the individual variables and parameters can be adapted to the requirements placed on the deceleration warning.

The invention claimed is:

1. A deceleration warning device for reducing rear-end collisions in road traffic, comprising:
    a sensor detecting a longitudinal acceleration value;
    a control device receiving the longitudinal acceleration value, determining an acceleration limit value, and generating a warning signal if the longitudinal acceleration value exceeds the acceleration limit value, the determination of the acceleration limit value based upon a plurality of signals including at least an anti-lock braking system (ABS) signal and a brake pedal position signal, the control device operable in at least the following three levels depending upon detected quality of the plurality of signals:
      a "Normal function" level when all of the signals are detected to be of high signal quality, the control device generating the warning signal based upon at least the brake pedal signal and the ABS signal, a "Limited function" level when at least one of the signals is detected to be of medium signal quality, the control device generating the warning signal based upon at least the brake pedal signal but not upon the ABS signal, and a "No function" level when at least one on the plurality of signals is detected to be of low signal quality, the control device not generating the warning signal; and a rear warning display device activated by the warning signal.

2. A deceleration warning device as claimed in claim 1, wherein the control device terminates generation of the warning signal after a time T, T being determined as a function of at least one of a behavior of a driver, a change in the longitudinal acceleration value, a vehicle speed, and an elapsed time since activation of the deceleration warning system.

3. A deceleration warning device as claimed in claim 1, wherein the control device measures a duration t of activation of the ABS system and takes account of the ABS signal only if the duration t exceeds a limit value.

4. A deceleration warning device as claimed in claim 1, wherein the control device ignores the ABS signal if the ABS acts on only one of two driven wheels.

5. A deceleration warning device as claimed in claims 1, wherein the control device receives a signal regarding the activation state of a brake assist system and to take account thereof in calculating the acceleration limit value.

6. A deceleration warning device as claimed in claims 1, wherein the sensor includes wheel speed sensors.

7. A deceleration warning device as claimed in claims 1, wherein the control device adapts the acceleration limit value using a statistical mean value of the longitudinal acceleration value and a lateral acceleration value for a defined past time period.

8. A deceleration warning device as claimed in claim 1, further comprising a filter device interposed between the sensor and the control device.

9. A deceleration warning device as claimed in claim 1, wherein the determination of the acceleration limit value is further based upon at least one parameter input to the control device by a user.

10. A deceleration warning device as claimed in claim 1, wherein the determination of the acceleration limit value is further based upon a current weather condition.

11. A method for activating a warning signal to reduce rear-end collisions in road traffic, comprising the following steps:

detecting a longitudinal acceleration value experienced by a vehicle;

determining an acceleration limit value based upon a plurality of signals including at least an anti-lock braking system (ABS) signal and a brake pedal position signal, at least one of the plurality of signals being identified as being of a high quality, a medium quality, or a low quality;

generating a warning signal based upon a comparison of the longitudinal acceleration value with the acceleration limit value, the comparison being accomplished in one of the following three ways:

generating the warning signal based upon at least the brake pedal signal and the ABS signal when all of the plurality of signals are detected to be of high quality, generating the warning signal based upon at least the brake pedal signal but NOT upon the ABS signal when at least one of the plurality of signals is detected to be of medium quality, and not generating the warning signal when at least one of the plurality of signals is detected to be of low quality; and displaying a rear warning if the warning signal is generated.

* * * * *